Patented Jan. 12, 1954

2,666,061

UNITED STATES PATENT OFFICE 2,666,061

METHOD OF PREPARING PYRIDOXAL PHOSPHATE

Stanton A. Harris, Westfield, and Andrew N. Wilson, Colonia, N. J., assignors to Merck & Co., Inc., Rahway, N. J., a corporation of New Jersey No Drawing. Application January 20, 1951, Serial No. 207,056

8 Claims. (Cl. 260—297)

This invention relates to a process for oxidizing organic amines to aldehydes, and more particularly to the oxidation of pyridoxamine phosphate to pyridoxal phosphate.

Pyridoxal phosphate having the formula:

is an active growth-promoting agent which activates the tyrosine decarboxylase system without the addition of adenosine triphosphate and also functions with the purified, cell-free tyrosine decarboxylase enzyme, for which pyridoxal and adenosine triphosphate are inactive.

It is an object of this invention to provide a process for oxidizing pyridoxamine phosphate to pyridoxal phosphate. Other objects will be apparent from the detailed description of our invention hereinafter provided.

In accordance with our invention, we have found that pyridoxamine phosphate is readily oxidized to pyridoxal phosphate. While various oxidizing agents may be used for this purpose, we have found that the oxidation is most conveniently effected by treating an aqueous solution of pyridoxamine phosphate with activated carbon or manganese dioxide.

Pyridoxamine phosphate, the starting material used in our process, having the formula:

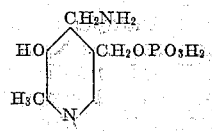

can be produced by phosphorylating pyridoxamine with an anhydrous phosphoric acid according to the method described in J. A. C. S. 70, 2101 (1948).

Pursuant to a preferred embodiment of our invention, we have found that an aqueous solution of pyridoxamine phosphate prepared by dissolving the reaction product of pyridoxamine and anhydrous phosphoric acid can be oxidized directly without first isolating the pyridoxamine phosphate. Thus, pyridoxamine dihydrochloride is first reacted with anhydrous phosphoric acid, and the resulting reaction mixture containing pyridoxamine phosphate and excess phosphoric acid is dissolved in water, and this resulting solution is reacted with an oxidizing agent to convert the pyridoxamine phosphate to the desired pyridoxal phosphate. For example, the aqueous solution of the pyridoxamine-phosphoric acid reaction mixture is treated with an activated charcoal which adsorbs the pyridoxamine phosphate and oxidizes this product to pyridoxal phosphate. After separating the charcoal adsorbate, it is washed successively with water, dilute acid, and finally with water again to remove any contaminating inorganic compounds. The pyridoxal phosphate is then recovered from the charcoal adsorbate by elution with an aqueous alkaline solution and the pyridoxal phosphate recovered from the resulting eluate. For this elution we prefer to use dilute ammonia water since this volatile base facilitates recovery of the pyridoxal phosphate from the eluate. Thus, the ammonium hydroxide eluate is evaporated under reduced pressure to obtain the ammonium salt of pyridoxal phosphate.

Alternatively, manganese dioxide can also be employed to oxidize the aqueous solution of the reaction product of pyridoxamide and phosphoric acid. In using manganese dioxide, this oxidizing agent is added directly to the aqueous solution of the reaction product previously adjusted to a pH of about 6 with alkali and the mixture warmed to about 60° C. for sufficient time to insure completion of the oxidation. The resulting reaction product is filtered to remove the precipitated manganese salt and the desired pyridoxal phosphate recovered from the filtrate.

In accordance with a further embodiment of our invention, the pyridoxal phosphate is readily separated from neutral or acidic aqueous solutions containing organic and inorganic phosphate, by adsorption on charcoal. The interfering substances can then be removed by washing the resulting charcoal adsorbate to remove said substances, and the pyridoxal phosphate recovered in substantially pure form by elution of the washed adsorbate. Thus for example, the pyridoxal phosphate is recovered from the filtrate described above by acidifying the filtrate with phosphoric acid, adsorbing the product from the acidified solution on charcoal, removing the resulting charcoal adsorbate, washing the charcoal adsorbate with water, dilute acid and finally with water again to remove the impurities, eluting the product from the washed charcoal adsorbate with dilute ammonia water, and evaporating the eluate under diminished pressure to obtain the ammonium salt of pyridoxal phosphate.

The following examples are presented to illustrate specific embodiments of our invention.

Example 1

Seventy-five grams of phosphorus pentoxide was dissolved in 100 grams of 85% ortho phosphoric acid to give anhydrous phosphoric acid, according to the method described by Ferrel, Olcott and Fraenkel-Conrat in J. Amer. Chem. Soc. 70, 210 (1948). To 20 grams of this anhydrous phosphoric acid, cooled to room temperature, was added 2 grams of pyridoxamine dihydrochloride. As the pyridoxamine dihydrochloride went into the solution there was a vigorous evolution of hydrogen chloride which was dissipated by vigorous stirring. When most of the gas has been evolved, the clear viscous solution was allowed to stand in a desiccator over phosphorus pentoxide for 3-6 days.

At the end of this time the reaction mixture was poured into about 300 grams of a mixture of crushed ice and water. The resulting colorless solution was treated with 35-40 grams of Darco G-60 (an activated charcoal), which adsorbed the phosphorylated amine. This adsorption is almost quantitative and can be followed by ultraviolet absorption spectrum. The charcoal adsorbate was filtered by suction and washed well with water to remove the bulk of occluded inorganic compounds. It was then mixed with one or two volumes of Polycel, a purified wood cellulose fiber, to facilitate washing, and was placed in a chromatograph column.

This charcoal mixture was washed with dilute hydrochloric acid (0.5-1%) to remove the remainder of the inorganic substances. It was then washed with water to remove the hydrochloric acid. Both of these washings were carried out thoroughly, as none of the phosphorylated material was removed by them. The charcoal adsorbent was washed with dilute ammonia water (0.5-1%) to elute the phosphorylated product. The eluate was vivid yellow in color due to the presence of the dissolved ammonium salt of pyridoxal phosphate. The phosphorylated amine had been oxidized by charcoal adsorbed oxygen to give the corresponding phosphorylated aldehyde. When about 700 ml. of filtrate had been collected most of the dissolved product had been removed. This filtrate was concentrated to about 50-100 ml. under reduced pressure and at a low temperature. It was then freeze-dried to give 1.5 g. of an amorphous brown hygroscopic powder containing the ammonium salt of pyridoxal phosphate. This substance showed strong codecarboxylase activity. The absorption spectrum of the ammonium salt of pyridoxal phosphate in aqueous solution made alkaline with sodium hydroxide to pH 10.5 showed principal maxima at about 2300 Å. and 3900 Å.; a shoulder at 2625-2715 Å; and a plateau at 3050-3200 Å.

Example 2

Pyridoxamine dihydrochloride (2.5 g.) was dissolved in 25 g. of the anhydrous phosphoric acid as described above with the accompanying evolution of hydrogen chloride. After standing 10-11 days at room temperature, the mixture was poured into about 200 ml. of ice and water. The acid was neutralized carefully with 30% sodium hydroxide solution until the reaction mixture was about pH 6.

One gram of manganese dioxide was added and the mixture was heated at 60° C. for 20 minutes with frequent shaking. The manganese dioxide was replaced by a light-colored inorganic solid believed to be manganous phosphate, and the colorless solution became yellow-brown due to the presence of the pyridoxal phosphate. The solution was cooled, filtered from the inorganic manganese salt, diluted with an equal volume of water and reacidified with phosphoric acid to Congo red. The pyridoxal phosphate was adsorbed on Darco G-60 as described in Example 1 and isolated in an identical manner. The yield of the freeze-dried residue was 2.6 grams. The absorption spectrum of the ammonium salt of pyridoxal phosphate in aqueous solution made alkaline with sodium hydroxide at pH 11.0 showed the principal maxima at about 2300 Å. and 3900 Å; a shoulder at 2650-2750 Å. and a plateau at 2850-3100 Å.

Example 3

Twenty-five grams of pyridoxamine dihydrochloride was dissolved in 250 grams of the anhydrous phosphoric acid as described in Example 1 and converted to the ammonium salt of pyridoxal phosphate in an identical manner. Instead of concentrating the ammonia eluate to dryness, however, it was concentrated to a volume of about 1 liter. The concentrate was acidified to pH ca. 5 with dilute acetic acid, and to it was added a solution of 18.5 grams of calcium acetate in water. As a large amount of precipitate formed, it was necessary to add additional acetic acid to bring it back into solution. A small amount of amorphous insoluble material was removed by filtration through Super-cel, and the clear filtrate was diluted with three volumes of ethyl alcohol. The mixture was allowed to stand overnight in the refrigerator. The precipitate was centrifuged, washed with a mixture of alcohol and water, with a mixture of alcohol and ether, finally with ether, and dried in a vacuum oven at 40-45° C. The yield of the bright yellow calcium salt of pyridoxal 5-phosphoric acid was 29 grams (97%).

The absorption spectrum of the calcium salt of pyridoxal phosphate obtained by dissolving the product in an aqueous solution of mineral acid and neutralizing the resulting solution to a pH of 11 with sodium hydroxide showed principal maxima at about 2280 Å., 3075 Å., and 3900 Å. and a shoulder at 2650-2750 Å.

Example 4

Pyridoxamine dihydrochloride (5 grams) was converted to pyridoxal phosphate by the use of anhydrous phosphoric acid and manganese dioxide as described in Example 2. Instead of isolating the solid, however, the aqueous solution was treated with hydroxylamine hydrochloride, in a solution of about pH 2. The pyridoxal phosphate oxime crystallized slowly from solution. Yield 2.6 grams (50%) M. P. 218° C. dec. The absorption spectrum in aqueous solution of the oxime at its own pH showed principal maxima at about 2300 Å., 2865 Å., and 3600Å. These values compared closely with those obtained on analysis of the same product prepared by another method.

Example 5

0.108 gram of the calcium salt of pyridoxamine phosphate was dissolved in 25 ml. water containing enough dilute hydrochloric acid to effect solution. The resulting sodium salt of pyridoxamine phosphate obtained by taking 1 ml. of this solution and diluting to 100 ml. with 0.1 N NaOH gave an absorption spectrum with principal maxima at 2475 A. and 3060 A.

Nine ml. of the starting solution was adjusted to pH 6 and to it was added 0.1 gram of manganese dioxide. The mixture was heated at 60–65° C. with frequent shaking for 20–25 minutes. The solution became yellow in color. It was cooled and the inorganic salts filtered out. Because of the dilution due to washing, 2 ml. of the filtrate was diluted to 100 ml. with 0.1 N NaOH; the absorption spectrum of this solution had a shoulder at 2700 Å., plateau at 2900 Å., and maxima at 3900 Å., showing that the pyridoxamine phosphate had been converted to pyridoxal phosphate.

Various changes and modifications may be made in carrying out the present invention without departing from the spirit and scope thereof. Insofar as these changes and modifications are within the purview of the annexed claims, they are to be considered as part of our invention.

We claim:

1. The process for preparing pyridoxal phosphate which comprises contacting an acidic aqueous solution of pyridoxamine phosphate with activated charcoal.

2. The process for preparing pyridoxal phosphate which comprises reacting an acidic aqueous solution of pyridoxamine phosphate with manganese dioxide.

3. The process which comprises contacting an acidic aqueous solution of pyridoxamine phosphate with activated charcoal, separating the resulting charcoal adsorbate, and eluting pyridoxal phosphate from said charcoal adsorbate with an aqueous alkaline solution.

4. The process which comprises contacting an acidic aqueous solution of pyridoxamine phosphate with activated charcoal, separating the resulting charcoal adsorbate, and eluting pyridoxal phosphate from said charcoal adsorbate with ammonia water.

5. The process which comprises contacting an acidic aqueous solution of pyridoxamine phosphate with activated charcoal, separating the resulting charcoal adsorbate, eluting pyridoxal phosphate from said charcoal adsorbate with ammonia water and recovering pyridoxal phosphate from said eluate.

6. The process which comprises reacting manganese dioxide with an acidic aqueous solution of pyridoxamine phosphate, adsorbing the pyridoxal phosphate thus formed in the aqueous solution with activated charcoal, and eluting said pyridoxal phosphate from the resulting charcoal adsorbate with ammonia water.

7. The process which comprises intimately contacting an acidic solution of pyridoxamine phosphate with an oxidizing agent from the group consisting of activated charcoal and manganese dioxide to produce pyridoxal phosphate.

8. The process which comprises treating an aqueous solution of pyridoxamine phosphate at a pH of about 6 with manganese dioxide, and warming the resulting reaction mixture to about 60° C. to form pyridoxal phosphate.

STANTON A. HARRIS.
ANDREW N. WILSON.

References Cited in the file of this patent

UNITED STATES PATENTS

| Number | Name | Date |
|---|---|---|
| 2,497,732 | Hoffman | Feb. 14, 1950 |

OTHER REFERENCES

Snell: J. Amer. Chem. Soc., vol 66 (1944), pp. 2082–2088.